United States Patent [19]

Hiller et al.

[11] 4,072,934
[45] Feb. 7, 1978

[54] METHOD AND APPARATUS FOR DETECTING A BLOCKAGE IN A VAPOR FLOW LINE

[75] Inventors: Trueman W. Hiller, Bettendorf; David C. Hamstra, Clinton, both of Iowa

[73] Assignee: Wylain, Inc., Dallas, Tex.

[21] Appl. No.: 760,716

[22] Filed: Jan. 19, 1977

[51] Int. Cl.$^2$ .............................................. G08B 21/00
[52] U.S. Cl. ...................................... 340/243; 141/7; 141/59; 141/95; 141/290; 364/510
[58] Field of Search ............... 340/243, 239 R; 141/7, 141/59, 95, 290; 235/92 FL, 92 MT, 151.34

[56] References Cited

U.S. PATENT DOCUMENTS

| | | | |
|---|---|---|---|
| 3,723,987 | 3/1973 | Barone, Jr. et al. | 340/239 R X |
| 3,911,975 | 10/1975 | van Soestbergen et al. | 141/95 |
| 3,955,070 | 5/1976 | Suzuki et al. | 235/92 MT |
| 3,978,462 | 8/1976 | Goodman | 340/243 |
| 3,983,913 | 10/1976 | Bower | 141/95 |
| 4,014,010 | 3/1977 | Jinotti | 340/239 R X |

Primary Examiner—John W. Caldwell, Sr.
Assistant Examiner—Daniel Myer
Attorney, Agent, or Firm—Lane, Aitken, Dunner & Ziems

[57] ABSTRACT

A method and apparatus for detecting blockages in one or more vapor flow lines such as vapor recovery lines used in liquid gasoline dispensing systems. The method and apparatus operate by sensing pressure in vapor flow lines and determining whether the frequency of the variations in the filtered rate of change with time of the pressure signal exceeds a preset limit indicating vapor bubbling through a liquid blockage. The method and apparatus also operate to determine whether the pressure signal exceeds a preset limit indicating a blockage condition.

24 Claims, 7 Drawing Figures

METHOD AND APPARATUS FOR DETECTING A BLOCKAGE IN A VAPOR FLOW LINE

BACKGROUND OF THE INVENTION

This invention relates to a method and apparatus for detecting blockage in a vapor flow line such a vapor return line in a liquid dispensing and vapor recovery system. Such systems are now commonly used in gasoline service stations in which liquid gasoline is dispensed from an underground storage tank to a container while vapors from the container are drawn back to the storage tank. With the recent increased emphasis on preventing pollution, attention has been directed to minimizing the escape of gasoline vapors to the atmosphere from both permanent storage tanks and vehicles into which gasoline is dispensed.

Satisfactory recovery of gasoline vapors from underground storage tanks can be achieved by providing a separate vapor return line connecting the storage tank to the tank truck which periodically fills the storage tank. In this manner liquid gasoline introduced into the storage tank from the tank truck displaces vapors in the storage tank and forces them through the recovery line to the tank truck to be ultimately disposed of either by burning or through compression-refrigeration systems. Because of the simple connections, vapor line blockage is usually not a problem.

Satisfactory systems for recovering vapors from the gasoline tanks of vehicles, however, are more difficult to design. One such system is the balanced displacement system in which gasoline entering a vehicle tank forces the vapors through a separate line to the storage tank. Other such systems employ vacuum pumps or blowers to remove the vapors from vehicle tanks and to return the vapors to the storage tank. These and similar systems all have in common a fluid line for communicating vapor from the vehicle tank back to the underground storage tank. The effectiveness of these vapor recovery systems can be defeated if the vapor return line becomes partially or completely blocked. For example, fuel may condense creating a liquid blockage in a vapor return hose line between the dispensing nozzle and the dispenser station. Blockage may also occur in a vapor return line between the dispenser station and the underground storage tank due, for example, to ground shift, liquid accumulation at a low spot or solid blockage. Blockage may also occur due to overfilling of the underground storage tank from a tank truck.

Because any of these types of blockages can diminish or defeat the effectiveness of the vapor recovery system, it is desirable to automatically monitor vapor return lines in order to determine whether a blockage has occurred. In fact, various governmental regulatory organizations such as the State of California, Air Resources Boards, have issued requirements for such systems. See, for example a document titled "Certification Procedures for Gasoline Vapor Recovery Systems at Service Stations" issued by the California Air Resources Board on Mar. 30, 1976.

SUMMARY OF THE INVENTION

It is, therefore, an object of the present invention to provide a method and apparatus for detecting blockages in one or more of a plurality of vapor flow lines such as vapor return lines in a multi-dispenser gasoline service station.

It is a further object to detect blockages occurring in a vapor flow line either between a container being filled with liquid and a dispensing station or between a dispensing station and a liquid storage tank.

It is a further object to provide means for detecting blockages due to either liquids or solids in a vapor return line and to provide automatic alarm indications whenever such a blockage is detected.

It is a further object to provide automatic means for controlling the liquid dispensing pumps when a detected vapor return line blockage persists for a preset period of time.

It is a still further object to provide apparatus to detect such blockages without undue requirements for calibration or adjustment by a manual operator.

It is a further object of the present invention to provide apparatus to accomplish the foregoing objectives in liquid dispensing systems having multiple separate and distinct dispensing stations such as in a multi-dispenser gasoline service station.

It is a further object to provide relatively low cost apparatus to accomplish the foregoing objectives.

Toward the fulfillment of these and other objects, the method and apparatus of the present invention includes means for sensing the pressure in a vapor line and providing a first signal representative of the pressure in said line, means producing a second signal representative of the rate of change with time of the first signal, means for comparing said first signal to a preset limit and means for comparing the variations in said second signal to a preset limit, and means producing an alarm indication of either said first signal or the variations in said second signal exceeds said preset limits, thereby detecting a blockage. Means are also provided for simultaneously monitoring the blockage status of a plurality of vapor lines, for maintaining calibration of the pressure sensing means, for providing local and central alarm indications of when blockages are detected, and for providing automatic control of liquid dispensing pumps when a detected blockage condition persists for an excessive period of time.

BRIEF DESCRIPTION OF THE DRAWINGS

in FIG. 5.

DESCRIPTION OF THE PREFERRED EMBODIMENTS

Figure 1:
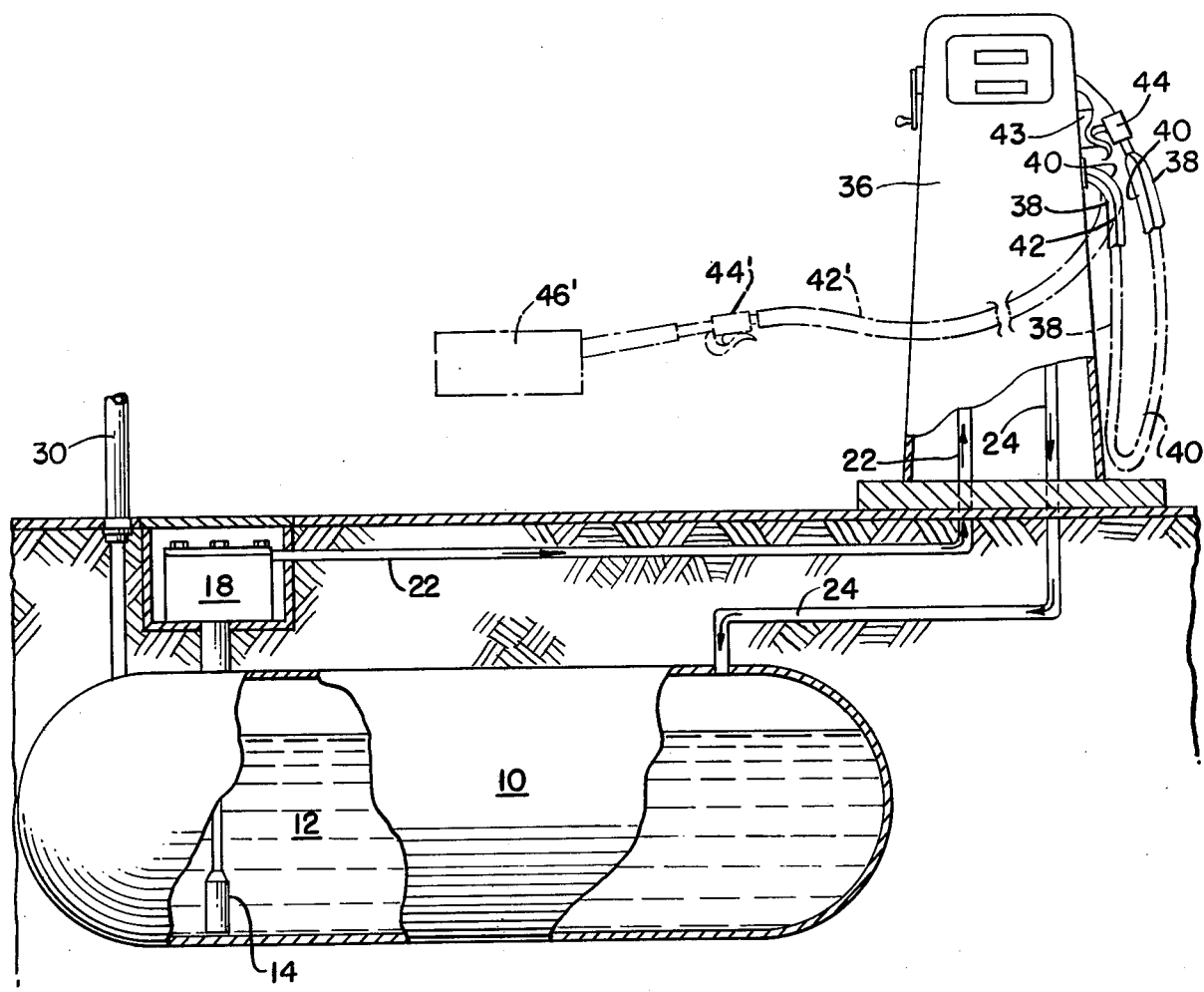
FIG. 1 is a partial schematic, partial elevational view illustrating a basic gasoline service station installation in which the method and apparatus of the invention is usable to detect blockage in a vapor flow line.

FIG. 1 illustrates an example of a liquid dispensing and vapor recovery system in which the method and apparatus of the present invention may be used. A basic gasoline dispensing installation such as used in a gosoline service station includes an underground storage tank 10 for storing a quantity of gasoline 12 which is delivered to a dispenser station or pedestal 36. An electrically operated centrifugal-type submersible pump 14 is disposed in the tank and operates to draw the gasoline into the unit through a plurality of intake ports disposed at the bottom thereof and to force the gasoline upwardly around a sealed electrical drive motor.

It is noted that the storage tank 10 is provided with a vent pipe 30 for exhausting vapor from the tank which may form due to diurnal losses.

A dispensing or nozzle means 44 is connected to the free end of a hose assembly 42 which is connected to the dispenser station 36. The hose assembly 42 includes two independent hoses or lines 38 and 40 running side by side within assembly 42. The hose 40 is connected within dispenser station 36 to conventinal liquid control apparatus (not shown). Pumped liquid gasoline from conduit 22 is communicated through the hose 40 for delivery at the nozzle 44. The hose 38 is similarly connected within the dispenser station 36 so that vapor from the nozzle or from a container being filled may be communicated back to storage tank 10 by means of the vapor return conduit 24. The dispensing means 44 is operated manually in a conventional manner to permit pumped gasoline from the tank 10 to be communicated to a container being filled. When not in use, dispensing means 44 is hung on a holder 43 which conventionally actuates a switch (not shown) which controls the pump unit 14 in a conventional manner.

The hose assembly 42 and dispensing means 44 are also shown in an alternative position as a hose assembly 42' and a dispensing means 44' in operation filling a container 46'.

Figure 2:
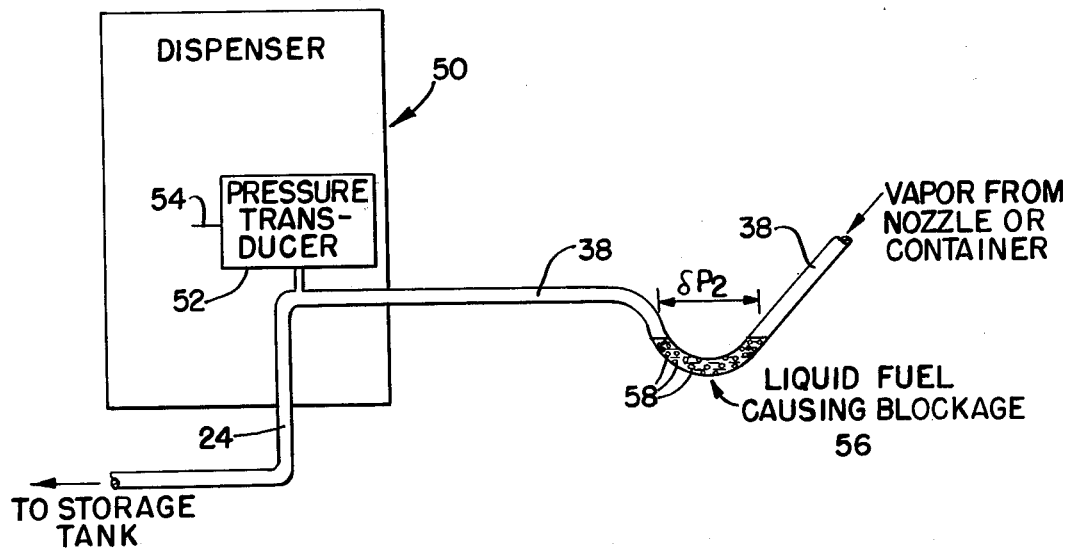
FIG. 2 is a partial schematic, partial elevational view illustrating one type of blockage in a vapor flow line and showing a pressure transducer connected to the line.

A dispenser station shown generally by numeral 50 in FIG. 2 corresponds to dispenser station 36 in FIG. 1. A vapor return conduit 24 is shown providing a fluid path from the dispenser station 50 back to a storage tank such as the tank 10. The vapor return conduit or hose 38 is similarly shown as in FIG. 1 running from the dispenser station 50 to a dispensing means or container being filled (not shown in FIG. 2) to provide a hose or conduit path for communicating vapor from such dispensing means or container back to the dispenser station.

Figure 3:
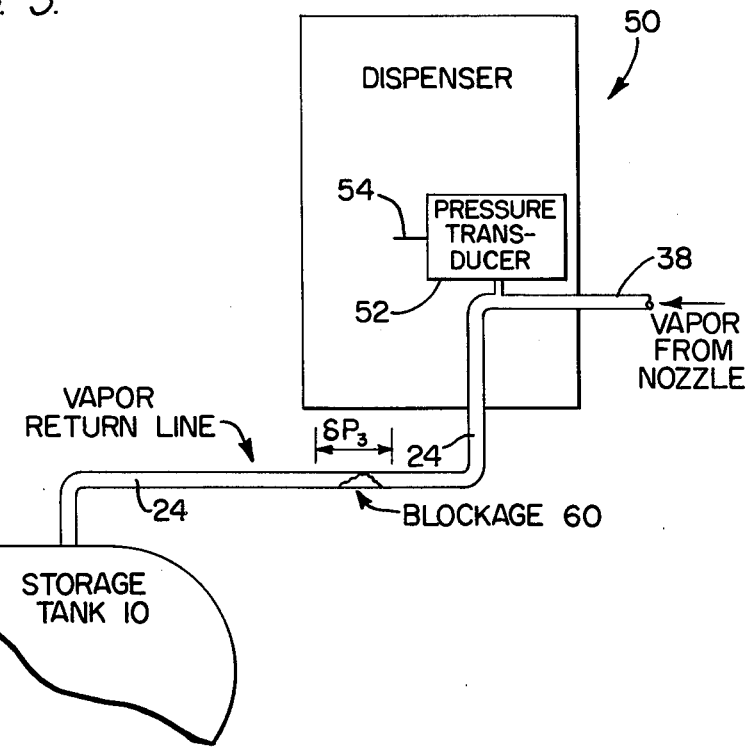
FIG. 3 is a partial schematic, partial elevational view illustrating another type of blockage in a vapor recovery flow line.

In FIG. 2 the vapor return hose 38 is shown directly connected to the vapor return conduit or line 24 as in a balanced displacement vapor recovery system. A similar connection of the lines 38 and 24 is shown in FIG. 3, and in FIG. 6 a direct connection of lines 38i and 24i is also shown. Although the specific connection shown for the lines in the drawings is for a balanced displacement system, it is to be understood that the method and apparatus of the present invention is not limited to such vapor recovery systems. More specifically, the present invention is equally usable with a blower assist system, a suction or aspirator assist system, as well as other systems.

A pressure transducer 52 is shown in FIGS. 2 and 3 connected to vapor recovery line 24-38 at dispenser station 50. The pressure transducer 52 may, for example, be a National Semiconductor pressure transducer Model LX1600G or equivalent, having an output signal on a line 54 which is representative of the pressure in the vapor recovery line. A mechanical transducer could also be used.

FIG. 2 further illustrates a liquid fuel blockage 56 in the vapor return hose 38 between the nozzle or container being filled (not shown) and the dispenser station 50. When such a blockage 56 occurs during vapor recovery operations, a pressure differential $\delta P_2$ will typically exist across the blockage 56, and vapor bubbles 58 will form and move through the liquid 56 due to the pressure differential.

FIG. 3 illustrates the dispenser station 50 with a solid blockage 60 in the vapor return line 24 between the dispenser 50 and tank 10. A pressure differential $\delta P_3$ will form across the blockage 60 during vapor recovery operation. Other types of blockages (not shown) which may be encountered in line 24 include liquid accumulation blockages at a low spot in line 24 and blockages due to overfilling of storage tank 10.

In a suction or aspirator assist type vapor recovery system, the pressure transducer 52 should be located in the vapor line near the aspirator intake. In a blower assist vapor recovery system, the pressure transducer 52 should be located in the vapor line near the vapor intake on a vapor control valve (not shown) of a type well known in the art.

Figure 4:
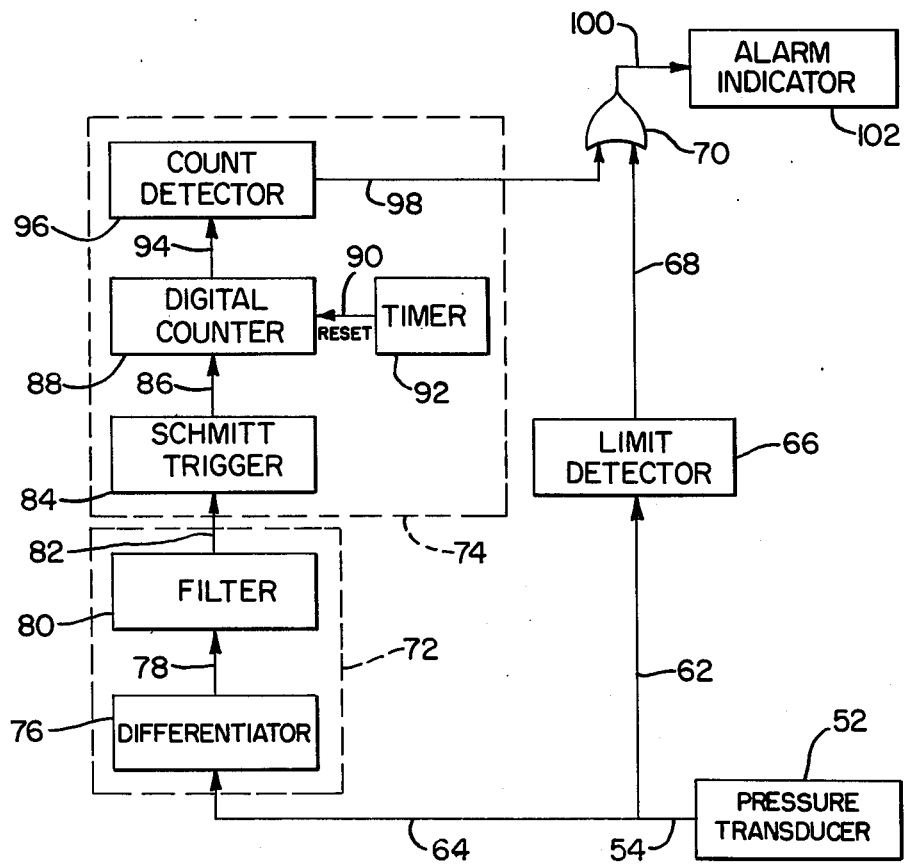
FIG. 4 is a schematic diagram of apparatus for detecting blockage in a vapor flow line according to the method of the invention.

In any event, the output 54 from the transducer 52 provides a signal representative of the pressure in the vapor line to be processed according to the method and the apparatus of the invention to detect blockages in the vapor return system. FIG. 4 is a schematic diagram of apparatus used to implement the method of the present invention. The output signal from the transducer 52 is provided over signal line 62 as an input to a limit detector 66. The pressure transducer signal is also provided over a signal line 64 as an input to a means 72. Means 72 produces an output signal on signal line 82 which is representative of the rate of change with time of the input signal to means 72 on signal line 64. The output signal from means 72 on signal line 82 is provided as an input to a detector means 74. The output signal from the detector means 74 on signal line 98 is provided as an input signal to an OR gate 70. The OR gate 70 is provided with another input by a signal line 68 carrying the output signal from the limit detector 66. The output signal from the OR gate 70 is provided on a signal line 100 as an input to an alarm indicator 102.

Means 72 may be realized with a differentiator 76 having an input from the signal line 64 and an output on a signal line 78. The output from the differentiator 76 is provided as an input to a filter 80 having its output on the signal line 82. In a preferred embodiment the differentiator and filter realization of means 72 is made with a conventional operational amplifier with resistors and capacitors to have a high frequency cut-off of approximately 100hz to eliminate unwanted noise.

The detailed implementation shown in FIG. 4 for the detector means 74 will now be described. The input signal to means 74 on the line 82, a signal representative of the rate of change with time of the pressure sensed by the pressure transducer 52, is provided as an input to a conventional Schmitt Triger device 84. The Schmitt Trigger 84 shapes the analog input signal on line 82 and produces output pulses corresponding to pressure peaks in the vapor line corresponding to bubbles. The output of the Schmitt Trigger is produced on a line 86 and is compatible with the input to a digital counter 88. The digital counter 88 is a conventional, resettable, binary digital counter having a series of flip-flop stages (not shown). The flip-flop stages of the digital counter 88 may be read out in parallel over a signal line 94 by a count detector 96. When the count in the digital counter 88 exceeds a particular count, the count detector 96 provides a signal output on output line 98. The digital counter 88 has a reset input and is provided with a periodic reset signal on a signal line 90 from a timer 92. Each time the timer 92 provides a reset signal, the digital counter 88 resets to count zero.

The operation of the detector means 74 will now be described. It is assumed the timer 92 has just reset the digital counter 88 to count zero. The input analog signal to means 74 is processed by the Schmitt Trigger 84 to provide a signal on line 86 to be counted by the digital counter 88. The digital counter 88 then counts each countable pulse in the signal on line 86. The counter 88 continues to count the pulse until it is reset back to count zero by the timer 92. At all times the count detector 96 detects whether the accumulated count exceeds a preset count limit. If the accumulated count in the digital counter 88 exceeds the preset count limit prior to being reset to count zero by timer 92, the count detector 96 provides an output signal on line 98 indicating that the count limit has been exceeded. Accordingly, by appropriate choice of the periodic reset interval provided by the timer 92 and the preset count limit in the count detector 96, the detector means 74 thus determines whether the frequency of the variations in the signal on input signal line 82 exceeds a preset limit.

The outputs from the detector 74 and the limit detector 66 are provided as the inputs to the OR gate 70, and the output from the OR gate 70 actuates the alarm indicator 102. The alarm indicator 102 is conventional and includes light indicators to provide visual signals and oscillator-speaker indicators to provide aural signals to a manual operator. The alarm indicator 102 also contains conventional latch or delay circuitry so that the alarm indications do not appear erratic to the manual operator.

The apparatus of FIG. 4 measures the amplitude of and frequency of variations in the rate of change with time of the pressure in the vapor return line to detect vapor line blockage. In the event of the liquid blockage 56 in the hose 37, vapor recovery system utilizing an "intended tight" nozzle to container seal (including balanced displacement and suction type vapor recovery systems) will experience a pressure build-up in the hose 38 on the container or nozzle side of the blockage 56. As a result of the pessure build-up, a series of vapor bubbles 58 will begin to bubble through the liquid 56, thereby causing pressure peaks in the vapor return line on the dispenser station and storage tank side of the blockage. The detector means 74 is preset to detect vapor line blockages equivalent to pressure peaks corresponding, for example, to one inch of water (1 inch $H_2O$) of head, $\delta P_2$. Similarly, blower assist vapor recovery systems also have pressure peaks when there is a liquid blockage 56 in the hose line 38 as in FIG. 2. In such systems, the relative vacuum across the blockage represented by the pressure differential $\delta P_2$ creates the bubbling action through the liquid blockage. The method and apparatus of FIG. 4 is equally effective in detecting liquid vapor blockages in such a system.

Blockages in the vapor return line may also occur in the line 24 between the dispenser station and the storage tank as shown in FIG. 3. Such blockages are most readily detected as changes in the pressure measured by the pressure transducer. For example, such a blockage in a balanced displacement or suction assist vapor recovery system will cause a relatively high pressure on the upstream side of the blockage. The pressure as sensed by the transducer 52 is monitored by limit detector 66 which is appropriately preset to provide an output on signal line 68 whenever the pressure equals or exceeds a preset limit, for example, two inches of water (2 inches of $H_2O$).

Figure 5:
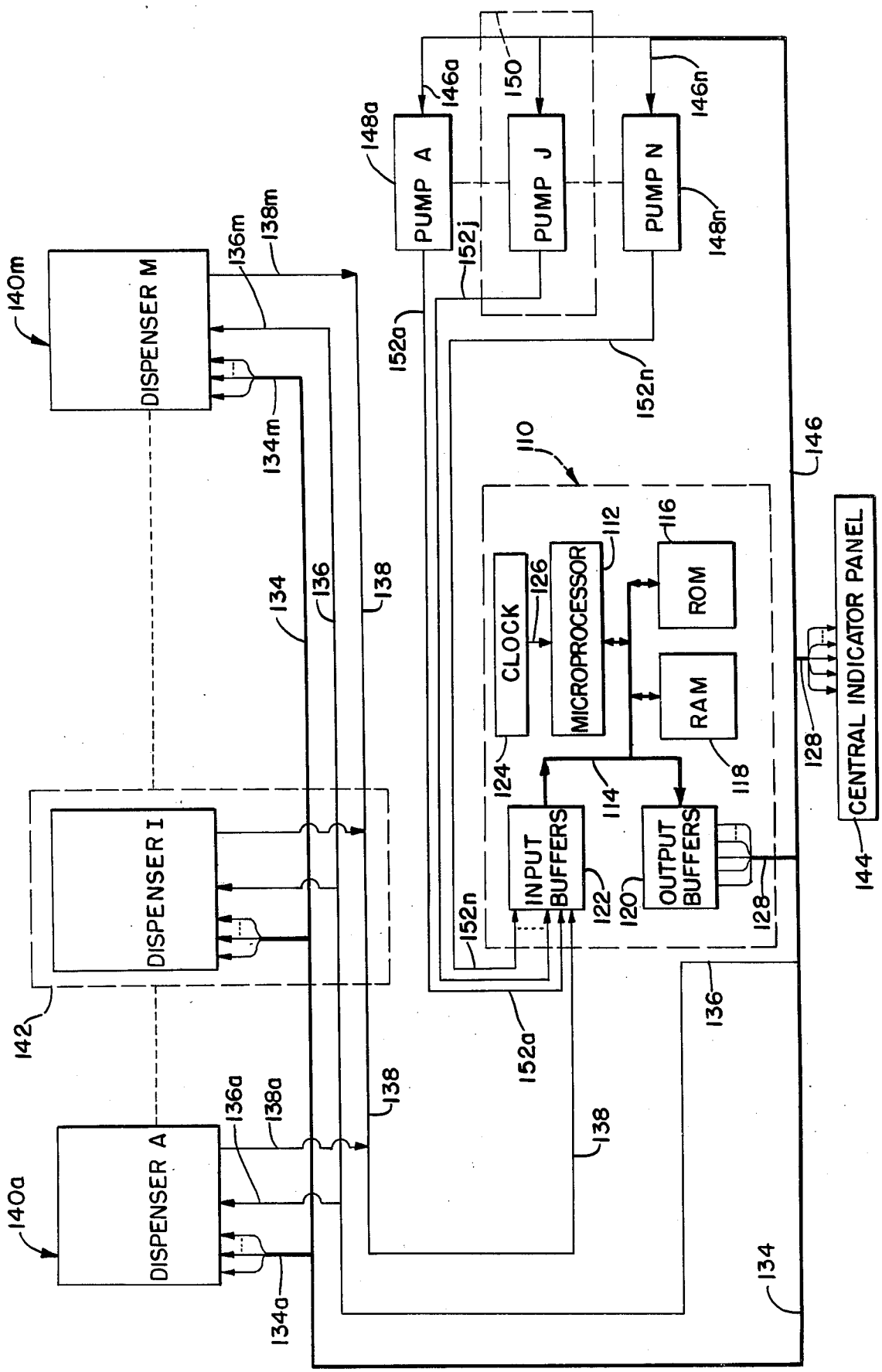
FIG. 5 is a schematic diagram of apparatus including a microprocessor controller for detecting blockages in one or more of a plurality of vapor flow lines according to the method of the invention.

The embodiment of FIG. 5 includes a microprocessor controller to detect blockages in one or more of a plurality of vapor flow lines according to the method of the invention. A microprocessor controller 110 is connected to a signal input line 138 from a plurality of dispenser stations 140a through 140m and from a plurality of signal input lines 152a through 152n from a plurality of pumps shown as 148a through 148n. The output from the controller 110 is a multi-conductor cable 128 which provides a number of signals, including interrogation code signals over a cable 134. The output signal on multi-conductor cable 134 is used to sequentially address the various dispenser stations 140a through 140m over cable 134 and cables 134a-134m as further described. Cable 128 also includes a signal line 136 which provides an input signal to each dispenser station 140a-140m. Cable 128 also includes signals provided over cable 146 as input signals to pump stations 148a-148n over signal lines 146a-146n as further described. The output signals on cable 128 are also provided as input signals to a central indicator panel 144.

Figure 6:
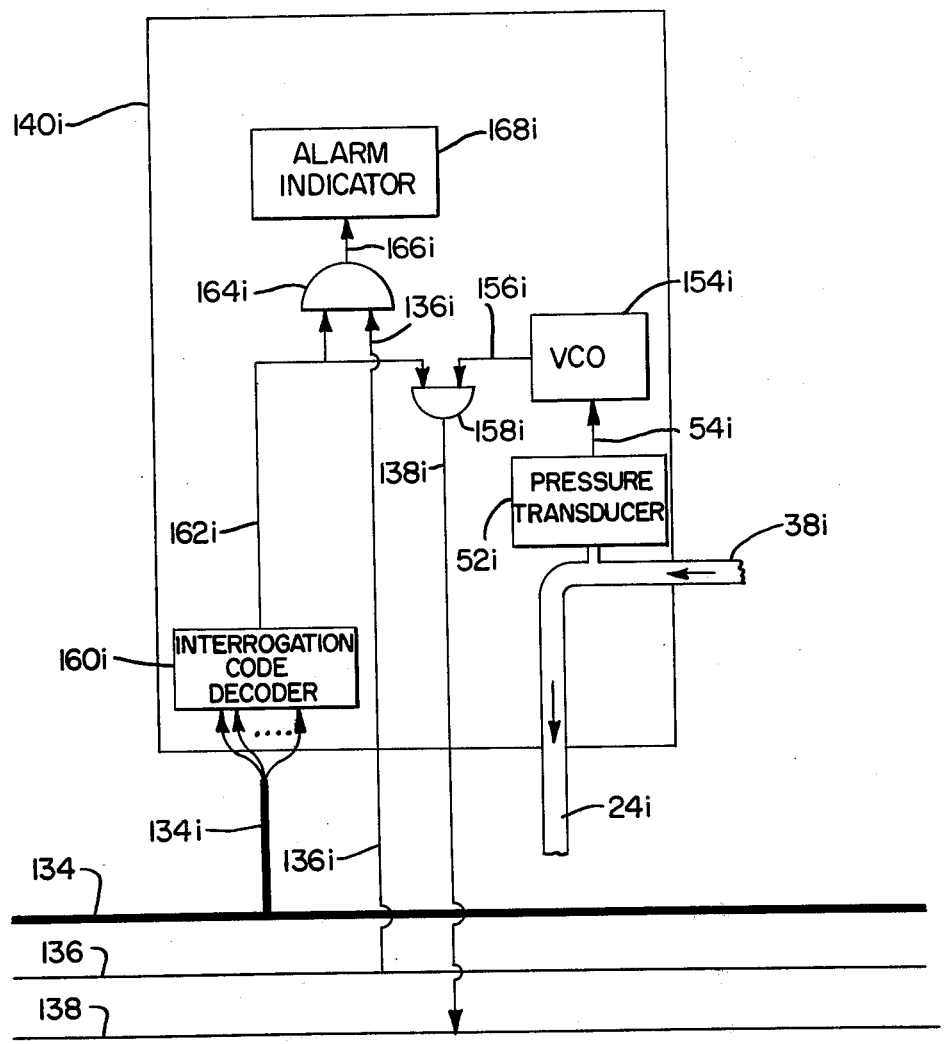
FIG. 6 is a partial schematic, partial elevational view illustrating certain apparatus associated with Dispenser Station I in FIG. 5.

Each of the dispenser stations 140a-140m is sequentially interrogated by the controller 110 by signals provided over interrogation line 134. FIG. 6 shows further detail for the elements enclosed by the hatched line 142 in FIG. 5. As shown in FIG. 6 an interrogation line 134i is connected to interrogation line 134 and provides input signals to an interrogation code decoder 160i at dispenser station I 140i. The total number of dispenser stations, 140a through 140m, in the system can be any reasonable integer number. As a specific example, consider a system in which there are sixteen dispenser stations. In such a case, four binary bit positions, one on each separate signal line in the interrogation cable 134, can provide a unique binary address for each dispenser station. In FIG. 6, the interrogation code decoder 160i senses the interrogation code input and provides a TRUE output signal over line 162i if the particular interrogation code on line 134i and line 134 is the proper access code for the particular dispenser station 140i.

The signal on line 162i is provided as an input signal to each of two AND gates 164i and 158i. The AND gate 164i controls the actuation of an alarm indicator 168i by an actuation signal on line 166i when there is a TRUE signal on line 162i and an alarm signal on a take-off alarm line 136i and line 136. Similarly, the AND gate 158i permits a signal on signal line 156i from a voltage controlled oscillator (VCO) 154i to be provided on output signal line 138i and response line 138 when the signal on line 162i is TRUE. The VCO 154i has its input connected to the output of the pressure transducer 52i over signal line 54i. The pressure transducer 52i senses the pressure in the vapor recovery line 24i and 38i and thereby causes the VCO frequency to be representative of the pressure being sensed. The operation of the other dispenser stations is the same, except that each dispenser station has a unique interrogation code and may be selectively accessed by the interrogation signal on line 134 controlled by the microprocessor controller 110.

In a preferred embodiment, the alarm indicator 168*i* is physically located at dispenser station 148*i* to provide visual and aural indications of vapor line blockage to a manual operator or user at that station. The alarm indicator 168*i* preferably includes latch or a delay circuitry so that the alarm signals will not appear erratic to the manual operator or user. For example, a latch or delay period is chosen to be approximately equal to the period of time between successive interrogation code accesses for dispenser station 140*i*. The central indicator panel 144 is located at a central control point associated with the gasoline service station and includes discrete readout devices so that a manual control operator may monitor the conditions of vapor lines and pumps associated with each dispenser station in the system. The central indicator panel 144 provides an aural alarm if a vapor line blockage is detected in any of the vapor return lines being monitored by the system.

Figure 7:
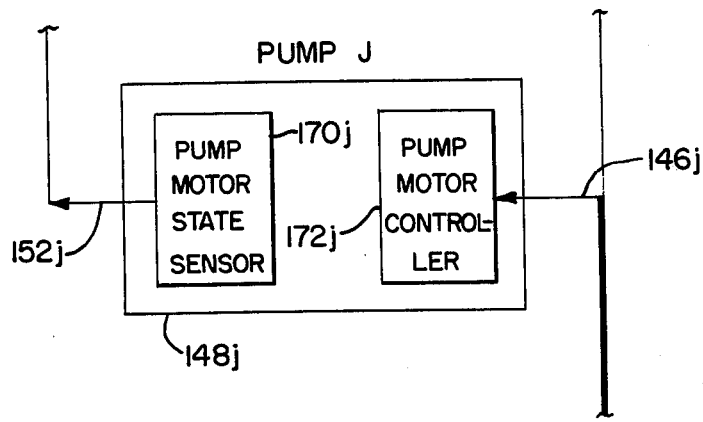
FIG. 7 is a schematic diagram illustrating certain apparatus associated with Pump J.

In FIG. 5 a plurality of pump stations 148*a*-148*n* are shown. The total number of pump stations can be any reasonable integer. A modern gasoline service station typically has at least three different storage tanks to accomodate three different grades of gasoline (low octane, high octane, and no-lead) and there is one pump for each tank. Each pump corresponds typically to the pump 14 in FIG. 1. Because the pump controls are provided in the central control house (not shown) at the service station where the microprocessor controller 110 and the panel 144 are also located, the separate signal lines 152*a*-152*n* from each pump station are provided as direct inputs to the microprocessor controller 110. A moderate size service station typically has only three pumps. The elements enclosed by the hatched line 150 in FIG. 5 are further illustrated in FIG. 7. As shown in FIG. 7, the output signal on the signal line 152*j* is a signal from a pump motor state sensor 170*j* which senses the state of the pump motor associated with pump station 148*j*. For example, if the pump motor associated with pump station 148*j* is in the OFF state, a binary zero signal is provided on line 152*j*. If the pump motor is in the ON state, a binary one signal is provided. This arrangement permits the controller 110 to continuously know the pump motor states and to use this information as will be further described. A pump motor controller 172*j* is also associated with the pump station 148*j* and an input signal line to the pump motor controller 172*j* is provided over line 146*j* which is connected to cable 146 from the microprocessor controller 110 output 128. By means of this arrangement, an appropriate output signal from the controller on line 146*j* may be used to shut off the pump motor, for example, if the uncorrected vapor line blockage persists for a certain period of time. The operation of the elements associated with the other pump stations is the same.

The microprocessor controller 110 includes a microprocessor central processing unit (CPU) 112 such as a Mostek F-8 microprocessor CPU. The CPU 112 is driven by a clock 124 which provides a periodic clock signal over signal line 126. The CPU 112 is connected by means of a data buss 114 to an input buffer 122 and an output buffer 120. Also connected to the data buss 114 is a read-only memory (ROM) 116 and a random access memory (RAM) 118. The input signal lines to the microprocessor controller 110 are provided as inputs to the input buffer 122 on input lines 138 and 152*a*-152*n*. The output signal lines on cable 128 from the microprocessor controller 110 are provided from the output buffer 120. The ROM 116 stores a software program which controls the operation of the microprocessor controller 110 in the system. The RAM 118 provides storage for variable data during operation of the system.

When the microprocessor controller 110 is initially turned on, all pump motor states are sensed. Normally all pump motors will be in the OFF state and the pressure in each vapor return line being monitored will be ambient, i.e., zero gage pressure. The microprocessor controller 110 then measures the center frequencies of the VCOs associated with each dispenser station to calibrate each associated pressure transducer. In a preferred embodiment each VCO center frequency is selected to be approximately 8 Khz for ambient pressure and the connection between each pressure transducer and the associated VCO is designed so that the VCO frequency will vary in a predetermined manner representative of the pressure changes in the associated vapor line. The initial measured VCO center frequency for each dispenser station is then stored in the random access memory 118 according to the software program of the microprocessor controller 110. The VCO center frequency information thus measured and stored is periodically remeasured to recalibrate each pressure transducer as further described.

The VCO output associated with a given dispenser station is provided over response line 138 as an input to the microprocessor controller 110 when the interrogation code established by the controller 110 addresses that particular dispenser station. Each VCO frequency and the period of each VCO output waveform provided on line 138 is asynchronous with respect to the microprocessor clock period provided by the clock 124. The asynchronous VCO signal on line 138 is counted in the microprocessor 110 under software control by using two registers (not shown). The first register is used to determine the number of clock periods for clock 124 over which the count is made. The second register is used to determine the number of countable transitions in the signal on the line 38. Although this method of measurement of the asynchronous signal does not produce an exact measurement, sufficient accuracy is obtained and it permits an embodiment with a minimum of hardware external to the controller 110. In an alternative embodiment (not shown) the asynchronous VCO signal can be counted for a fixed period in a resettable digital counter (not shown) external to the microprocessor 110. With such an embodiment the digital counter flip-flop (not shown) states are read out in parallel into the microprocessor immediately prior to reset of the digital counter by the microprocessor.

In a preferred embodiment the microprocessor makes approximately 100 separate discrete measurements of the frequency of the asynchronous VCO signal on input line 138 each time a particular dispenser station is addressed or interrogated. By making this number of measurements, the measured data can be averaged and can also be used to determine, digitally, the rate of change with time of the VCO frequency during the access period for a given dispenser. It is also possible for the controller 110 to digitally filter that data and to determine the frequency of the variations in the rate of change with time of the VCO frequency. In a preferred embodiment, the microprocessor 110 provides a total access period for each dispenser station of approximately one-half second during interrogation.

By this technique the controller 110 is able to obtain and store an initial calibration measurement for each VCO center frequency corresponding to ambient pressure in each vapor line being monitored. Then, by successively accessing each dispenser station, by making a plurality of successive discrete measurements of the VCO frequency during each access period, and by processing the measurement information, the controller 110 is able to determine both whether the measured VCO frequency at a subsequent time deviates by a sufficient amount from the calibrated VCO center frequency to indicate an absolute pressure condition exceeding a preset limit indicating a vapor line blockage. Bubble conditions in the vapor line produce pressure peaks causing changes with time in the frequency of the VCO signal. Controller 110, by digitally processing the approximately 100 discrete measurements of the VCO frequency made during each interrogation interval, can determine the rate of change with time of the VCO frequency over that interval and detect whether the number of variations in that rate of change with time data exceeds a preset limit indicating a bubble condition type blockage in the vapor return line. If a blockage condition is detected, the controller 110 generates an appropriate alarm signal which is provided on output cable 128 to the central indicator panel 144 and on alarm line 136 connected to cable 128 to actuate the alarm indicators at the associated dispenser station. In the event the blockage condition is not corrected within a certain period of time, the microprocessor controller then generates and provides an appropriate signal on output line 128 and over line 146 to cause the pump associated with the particular dispenser and vapor line to be shut off. Liquid blockage as shown in FIG. 2 can often be remedied simply by lifting the hose 38, thereby causing the liquid to move within the line to point at which there will be no blockage.

In a preferred embodiment the microprocessor 110 periodically (e.g. every 10 minutes or when possible) remeasures and recalibrates the VCO center frequency to compensate for thermal or other drifts in the pressure transducer, the VCO, or other analog signal elements in the system. The microprocessor controller 110 has information about the state of each pump motor and can determine whether, and if so, for how long, a particular pump has been in the OFF state. A particular pump might remain in the OFF state for a period of time because there were no users of the dispensers associated with that pump. If a pump is OFF for a period of time (e.g. one minute) and the associated vapor lines have not been recently blocked, there is a high probability that the pressure in the associated vapor lines is ambient. Accordingly, the microprocessor then measures each VCO center frequency and updates the stored VCO center frequency information. Use of this approach eliminates the need for manual calibration or adjustment.

As further indicated above, the microprocessor controller sequentially generates interrogation codes which are used to address the dispenser stations having vapor return lines being monitored.

It is thus seen that the present invention provides a method and apparatus for detecting blockages in one or more of a plurality of vapor flow lines such as vapor return lines in a gasoline service station. However, the method and the apparatus of the present invention are not limited to detecting blockages in gasoline vapor return lines in a service station, but can be applied to any installtion such as chemical plants in which the detection of vapor line blockages is desired or required.

Of course, other variations of the specific construction and arrangement of the apparatus and method disclosed above can be made by those skilled in the art without departing from the invention as defined in the appended claims.

What is claimed is:

1. A method for detecting blockage in a vapor flow line adapted to communicate vapor from a container adapted to hold a variable amount of fluid to a point remote from the container, said method comprising the steps of:
   obtaining a first signal representative of the pressure in the vapor flow line;
   producing a second signal representative of the rate of change with time of said first signal; and
   detecting if the frequency of the variations in said second signal exceeds a first preset limit to detect a blockage in the vapor flow line.

2. The method of claim 1 comprising detecting if said first signal exceeds a second preset limit to detect a blockage in the vapor flow line.

3. The method of claim 2 comprising producing an alarm indication if a blockage in the vapor flow line is detected.

4. The method of claim 1 wherein said step of producing said second signal comprises differentiating and filtering said first signal.

5. The method of claim 4 wherein said detecting step comprises counting the variations in said second signal over an interval of time to determine if the number of variations exceed a preset limit corresponding to said first preset limit.

6. The method of claim 1 wherein said step of obtaining said first signal comprises:
   producing an analog signal representative of the pressure in the vapor flow line; and
   periodically measuring said analog signal to produce a series of discrete measurements constituting the first signal.

7. The method of claim 6 wherein said detecting step comprises determining if the number of variations in a time interval in the filtered rate of change with time of said series of discrete measurements exceeds a preset limit corresponding to said first preset limit.

8. A method for detecting a blockage in a vapor return line in a liquid dispensing and vapor recovery system comprising a storage tank for storing liquid to be dispensed, means adapted for dispensing liquid from said storage tank into a container, a fluid line for communicating liquid from said storage tank to said dispensing means, and a vapor return line adapted for communicating vapor from a container being filled with liquid dispensed from said dispensing means to said storage tank, said method comprising the steps of:
   obtaining a first signal representative of the pressure in the vapor return line;
   producing a second signal representative of the rate of change with time of said first signal; and
   detecting if the frequency of the variations in said second signal exceeds a first preset limit to detect a blockage in the vapor return line.

9. The method of claim 8 comprising detecting if said first signal exceeds a second preset limit to detect a blockage in the vapor return line.

10. The method of claim 9 comprising producing an alarm indication if a blockage in the vapor return line is detected.

11. Apparatus for detecting blockage in a vapor flow line adapted to communicate vapor from a container adapted to hold a variable amount of fluid to a point remote from the container, said apparatus comprising:
means for producing a first signal representative of the pressure in the vapor flow line;
means for producing a second signal representative of the rate of change with time of said first signal; and
means for detecting if the frequency of the variations in said second signal exceeds a first preset limit to detect a blockage in the vapor flow line.

12. The apparatus of claim 11 comprising means for detecting if said first signal exceeds a second preset limit to detect a blockage in the vapor flow line.

13. The apparatus of claim 12 comprising means for producing an alarm indication if a blockage in the vapor flow line is detected.

14. The apparatus of claim 11 wherein said means for producing said second signal comprises a differentiator means and a filter means.

15. The apparatus of claim 14 wherein said detecting means comprises a counter means, a count detector means to detect the count of said counter means, and a timer means to control the counting interval of said counter means.

16. The apparatus of claim 11 wherein said first signal and second signal are digital signals, and wherein said means for producing said first signal comprises:
means for producing an analog signal representative of the pressure in the vapor flow line; and
means for periodically measuring said analog signal to produce a series of discrete measurements constituting said first signal.

17. The apparatus of claim 16 wherein said means for periodically measuring comprises a microprocessor controller including:
a microprocessor CPU;
a clock connected to said CPU;
a data buss connected to said CPU;
memory means for storing a program for and data being processed by said controller and connected to said data buss; and
input/output means connected to said data buss for providing signals to and signals from said controller; and
wherein said series of discrete measurements are stored in said memory means.

18. The apparatus of claim 17 wherein said controller is adapted to simultaneously monitor a plurality of independent vapor flow lines to detect blockages in any of said lines.

19. Apparatus for detecting a blockage in a vapor return line in a liquid dispensing and vapor recovery system comprising:
a storage tank for storing liquid to be dispensed;
means adapted for dispensing liquid from said storage tank into a container;
a vapor return line adapted for communicating vapor from a container being filled with liquid dispensed from said dispensing means to said storage tank;
means for producing a first signal representative of the pressure in the vapor return line;
means for producing a second signal representative of the rate of change with time of said first signal; and
means for detecting if the frequency of the variations in said second signal exceeds a first preset limit to detect a blockage in the vapor return line.

20. The apparatus of claim 19 comprising means for detecting if said first signal exceeds a second preset limit to detect a blockage in the vapor return line.

21. The apparatus of claim 20 comprising means for producing an alarm indication if a blockage in the vapor return line is detected.

22. The apparatus of claim 19 wherein said first signal and said second signal are digital signals, and wherein said means for producing said first signal comprises:
means for producing an analog signal representative of the pressure in the vapor return line; and
means for periodically measuring said analog signal to produce a series of discrete measurements constituting said first signal.

23. The apparatus of claim 22 wherein said means for periodically measuring comprises a microprocessor controller including:
a microprocessor CPU;
a clock connected to said CPU;
a data buss connected to said CPU;
memory means for storing a program for and data being processed by said controller and connected to said data buss; and
input/output means connected to said data buss for providing signals to and signals from said controller; and
wherein said series of discrete measurements is stored in said memory means.

24. The apparatus of claim 23 wherein said controller is adapted to simultaneously monitor a plurality of independent vapor flow lines to detect blockages in any of said lines.

* * * * *

UNITED STATES PATENT OFFICE
CERTIFICATE OF CORRECTION

Patent No. 4,072,934          Dated February 7, 1978

Inventor(s) Trueman Hiller and David C. Hamstra

It is certified that error appears in the above-identified patent and that said Letters Patent are hereby corrected as shown below:

Under column 1 of Background of the Invention the 16th line should read as follows:
"permanent storage tanks and vehicle tanks into which gaso-"

Under column 2 of Summary of the Invention the 32nd line should read as follows:
"preset limit, and means producing an alarm indication if"

Under column 3 of Description of the Preferred Embodiments the 7th line should read as follows:
"gasoline dispensing installation such as used in a gaso-"

Under column 5 of Description of the Preferred Embodiments the 51st line should read as follows:
"a result of the pressure build-up, a series of vapor bubbles"

Under column 8 of Description of the Preferred Embodiments the 42nd line should read as follows:
"the signal on the line 138. Although this method of mea-"

Under column 8 of the Description of the Preferred Embodiments the 68th line should read as follows:
"mately one-half second during each interrogation."

Signed and Sealed this

Thirteenth Day of June 1978

[SEAL]

Attest:

RUTH C. MASON
Attesting Officer

DONALD W. BANNER
Commissioner of Patents and Trademarks